United States Patent
Jin et al.

(10) Patent No.: US 10,186,032 B2
(45) Date of Patent: Jan. 22, 2019

(54) SIMULTANEOUS MULTI-SLICE PHASE PULSE WAVE VELOCITY MEASUREMENT IN A VESSEL

(71) Applicant: Siemens Healthcare GmbH, Erlangen (DE)

(72) Inventors: Ning Jin, Powell, OH (US); Jiang Pang, Chicago, IL (US); Dingxin Wang, Apple Valley, MN (US); Peter Speier, Erlangen (DE); Shivraman Giri, Chicago, IL (US)

(73) Assignee: Siemens Healthcare GmbH, Erlangen (DE)

(*) Notice: Subject to any disclaimer, the term of this patent is extended or adjusted under 35 U.S.C. 154(b) by 51 days.

(21) Appl. No.: 15/623,721

(22) Filed: Jun. 15, 2017

(65) Prior Publication Data
US 2018/0365823 A1   Dec. 20, 2018

(51) Int. Cl.
| G06K 9/00 | (2006.01) |
| G06T 7/00 | (2017.01) |
| G06T 11/00 | (2006.01) |

(52) U.S. Cl.
CPC .......... *G06T 7/0012* (2013.01); *G06T 11/003* (2013.01)

(58) Field of Classification Search
None
See application file for complete search history.

(56) References Cited

U.S. PATENT DOCUMENTS

| 5,436,562 A * | 7/1995 | Dumoulin | G01F 1/716 |
| | | | 324/306 |
| 6,261,233 B1 * | 7/2001 | Kantorovich | A61B 8/06 |
| | | | 600/454 |
| 9,911,062 B1 * | 3/2018 | Ahmad | G06K 9/52 |
| 2004/0044280 A1 * | 3/2004 | Paley | G01R 33/445 |
| | | | 600/410 |
| 2017/0311821 A1 * | 11/2017 | Ledoux | G06T 7/246 |

OTHER PUBLICATIONS

Barth, Markus, et al. "Simultaneous multislice (SMS) imaging techniques." Magnetic resonance in medicine 75.1 (2016): 63-81.
Breuer, Felix A., et al. "Controlled aliasing in parallel imaging results in higher acceleration (CAIPIRINHA) for multi-slice imaging." Magnetic resonance in medicine 53.3 (2005): 684-691.
(Continued)

*Primary Examiner* — Shervin Nakhjavan

(57) ABSTRACT

Embodiments can provide a computer-implemented method for simultaneous multi-slice pulse wave velocity measurement, the method comprising simultaneously acquiring a plurality of multiple parallel images slices from a medical imaging device; shifting the plurality of image slices through modulation of the line-by-line phase patterns for each slice in the plurality of slices; deriving a plurality of image waveforms from the plurality of slices; measuring a distance between a plurality of imaging planes corresponding to the plurality of image slices; determining, for each of the image waveforms, a time-to marker; determining the temporal shift by calculating the difference between the time-to markers; and computing the pulse wave velocity by dividing the distance between the plurality of imaging planes by the temporal shift.

20 Claims, 6 Drawing Sheets

(56) References Cited

OTHER PUBLICATIONS

Reference Values for Arterial Stiffness' Collaboration. "Determinants of pulse wave velocity in healthy people and in the presence of cardiovascular risk factors:'establishing normal and reference values'." European heart journal 31.19 (2010): 2338-2350.
Sugawara, Jun, Koichiro Hayashi, and Hirofumi Tanaka. "Distal shift of arterial pressure wave reflection sites with aging." Hypertension 56.5 (2010): 920-925.
Feiden, Samuel W., et al. "A new method for the determination of aortic pulse wave velocity using cross-correlation on 2D PCMR velocity data." Journal of Magnetic Resonance Imaging 27.6 (2008): 1382-1387.
Yu, Hsi-Yu, et al. "Quantification of the pulse wave velocity of the descending aorta using axial velocity profiles from phase-contrast magnetic resonance imaging." Magnetic resonance in medicine 56.4 (2006): 876-883.

\* cited by examiner

SIMULTANEOUS MULTI-SLICE PHASE PULSE WAVE VELOCITY MEASUREMENT IN A VESSEL

TECHNOLOGY FIELD

The present invention relates generally to methods, systems, and apparatuses for simultaneous multi-slice pulse wave velocity estimation in a blood vessel.

BACKGROUND

Pulse wave velocity (PWV) is defined as the rate at which the systolic bolus of blood, pumped from the heart, transverses the vasculature. It is the biomarker directly related to vessel stiffness and has the potential to provide early indication of atherosclerosis. PWV can be determined by measuring blood flow within a vessel at multiple locations. Currently, determining PWV increases scan planning burden and total acquisition time, which in turn can increase overall patient table time in a medical imaging device. Better and faster methods of determining PWV can increase patient throughput and increase accuracy of the PWV measurement.

SUMMARY

Embodiments can provide a computer-implemented method for simultaneous multi-slice pulse wave velocity measurement, the method comprising simultaneously exciting a plurality of multiple parallel images slices from a medical imaging device; shifting the plurality of image slices through modulation of the line-by-line phase patterns for each slice in the plurality of slices; deriving a plurality of image waveforms from the plurality of slices; measuring a distance between a plurality of imaging planes corresponding to the plurality of image slices; determining, for each of the image waveforms, a time-to marker; determining the temporal shift by calculating the difference between the time-to markers; and computing the pulse wave velocity by dividing the distance between the plurality of imaging planes by the temporal shift.

Embodiments can further provide a method further comprising separating the plurality of image slices through exploitation of coil sensitivity information.

Embodiments can further provide a method further comprising acquiring a plurality of image slices from a medical imaging device using in-plane parallel imaging techniques.

Embodiments can further provide a method further comprising deriving the plurality of image waveforms from the plurality of slices using cine or phase contrast.

Embodiments can further provide a method further comprising deriving the plurality of image waveforms from the plurality of slices using a signal intensity curve of a 2D cine sequence or a velocity waveform of a 2D phase contrast sequence.

Embodiments can further provide a method wherein the plurality of multiple parallel images slices comprises at least two image slices.

Embodiments can further provide a method wherein the time-to markers comprise either a time-to-peak or time-to-foot.

In another illustrative embodiment, a non-transitory computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a medical imaging device comprising an imaging processor configured to perform various ones of, and combinations of, the operations outlined above with regard to the method illustrative embodiment.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

This invention disclosure describes simultaneous multi-slice (SMS) methods (SMS phase contrast imaging and SMS cine imaging) for pulse wave velocity (PMV) estimation in a blood vessel. SMS enables simultaneous measurements from multiple parallel locations by acquiring multiple (two or more) two-dimensional (2D) slices at the same time. Simultaneity in SMS sequences ensures that multiple slices can be acquired in the same physiological condition and removes the cardiac and respiratory variability in the conventional 2D sequential acquisition. The waveforms derived from SMS measurements may potentially allow for more accurate pulse wave velocity (PWV) estimation in the vessel.

Using conventional 2D acquisition techniques, each of the two or more slices has to be prescribed by the operator individually across the vessel, which can be a time consuming process. Due to respiratory motion, patient breath-hold is normally required during image acquisition. However, because of patient breath-hold limitation, multiple slices have to be acquired over multiple breath holds, resulting in a long scan time and patient discomfort. Furthermore, physiological conditions, such as heart rate, breath-hold position, or blood pressure, may change from one measurement to the next. Such changes may shift time-to-peak/time-to-foot from one measurement to the next measurement and lead to errors in PWV estimation.

The embodiments described herein apply SMS methods for PWV estimation in blood vessels. SMS techniques can be combined with PC or cine imaging. By taking the advantage of SMS, flow waveforms from multiple slices can be be simultaneously obtained in a single acquisition, which reduces the scan planning burden and total acquisition time. Moreover, the embodiments described herein have the potential to further reduce the overall MR table time and increase patient throughput. Since the multiple slices can be acquired in the same acquisition under the same physiological conditions, simultaneity in SMS can remove the variability in cardiac and respiratory rates between the conventional sequential 2D acquisitions, allowing more accurate measurement of PWV.

Figure 1:
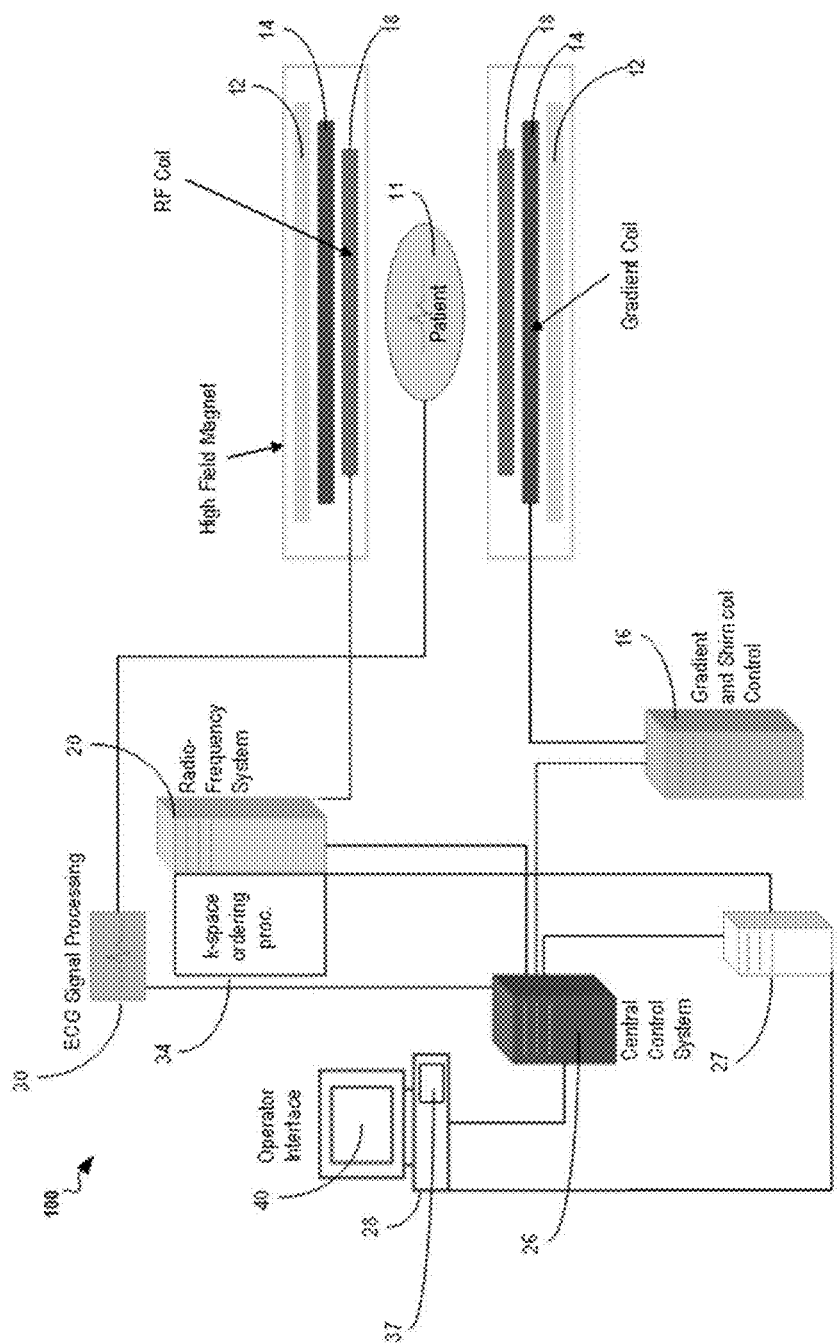
FIG. 1 shows a medical imaging device for simultaneous multi-slice pulse wave velocity measurement, as used by some embodiments of the present invention.

FIG. 1 shows a medical imaging device 100 for acquiring simultaneous multi-slice images, as used by some embodiments of the present invention. In system 100, magnetic coils 12 create a static base magnetic field in the body of patient 11 to be imaged and positioned on a table. Within the magnet system are gradient coils 14 for producing position dependent magnetic field gradients superimposed on the static magnetic field. Gradient coils 14, in response to gradient signals supplied thereto by a gradient and shim coil control module 16, produce position dependent and shimmed magnetic field gradients in three orthogonal directions and generates magnetic field pulse sequences. The shimmed gradients compensate for inhomogeneity and variability in an MRI device magnetic field resulting from patient anatomical variation and other sources. The magnetic field gradients include a slice-selection gradient magnetic field, a phase-encoding gradient magnetic field and a readout gradient magnetic field that are applied to patient 11.

Further RF module 20 provides RF pulse signals to RF coil 18, which in response produces magnetic field pulses which rotate the spins of the protons in the imaged body of the patient 11 by ninety degrees or by one hundred and eighty degrees for so-called "spin echo" imaging, or by angles less than or equal to 90 degrees for so-called "gradient echo" imaging. Gradient and shim coil control module 16 in conjunction with RF module 20, as directed by central control unit 26, control slice-selection, phase-encoding, readout gradient magnetic fields, radio frequency transmission, and magnetic resonance signal detection, to acquire magnetic resonance signals representing planar slices of patient 11.

In response to applied RF pulse signals, the RF coil 18 receives magnetic resonance signals, i.e., signals from the excited protons within the body as they return to an equilibrium position established by the static and gradient magnetic fields. The magnetic resonance signals are detected and processed by a detector within RF module 20 and k-space component processor unit 34 to provide a magnetic resonance dataset to an image data processor for processing into an image. In some embodiments, the image data processor is located in central control unit 26. However, in other embodiments such as the one depicted in FIG. 1, the image data processor is located in a separate unit 27. Electrocardiography (ECG) synchronization signal generator 30 provides ECG signals used for pulse sequence and imaging synchronization. A two or three dimensional k-space storage array of individual data elements in k-space component processor unit 34 stores corresponding individual frequency components comprising a magnetic resonance dataset. The k-space array of individual data elements has a designated center and individual data elements individually have a radius to the designated center.

A magnetic field generator (comprising coils 12, 14, and 18) generates a magnetic field for use in acquiring multiple individual frequency components corresponding to individual data elements in the storage array. The individual frequency components are successively acquired in an order in which radius of respective corresponding individual data elements increases and decreases along a substantially spiral path as the multiple individual frequency components are sequentially acquired during acquisition of a magnetic resonance dataset representing a magnetic resonance image. A storage processor in the k-space component processor unit 34 stores individual frequency components acquired using the magnetic field in corresponding individual data elements in the array. The radius of respective corresponding individual data elements alternately increases and decreases as multiple sequential individual frequency components are acquired. The magnetic field acquires individual frequency components in an order corresponding to a sequence of substantially adjacent individual data elements in the array and magnetic field gradient change between successively acquired frequency components which are substantially minimized.

Central control unit 26 uses information stored in an internal database to process the detected magnetic resonance signals in a coordinated manner to generate high quality images of a selected slice(s) of the body (e.g., using the image data processor) and adjusts other parameters of system 100. The stored information comprises predetermined pulse sequence and magnetic field gradient and strength data as well as data indicating timing, orientation and spatial volume of gradient magnetic fields to be applied in imaging. Generated images are presented on display 40 of the operator interface. Computer 28 of the operator interface includes a graphical user interface (GUI) enabling user interaction with central control unit 26 and enables user modification of magnetic resonance imaging signals in substantially real time. Continuing with reference to FIG. 1, display processor 37 processes the magnetic resonance signals to reconstruct one or more images for presentation on display 40, for example. Various techniques generally known in the art may be used for reconstruction.

Figure 2:
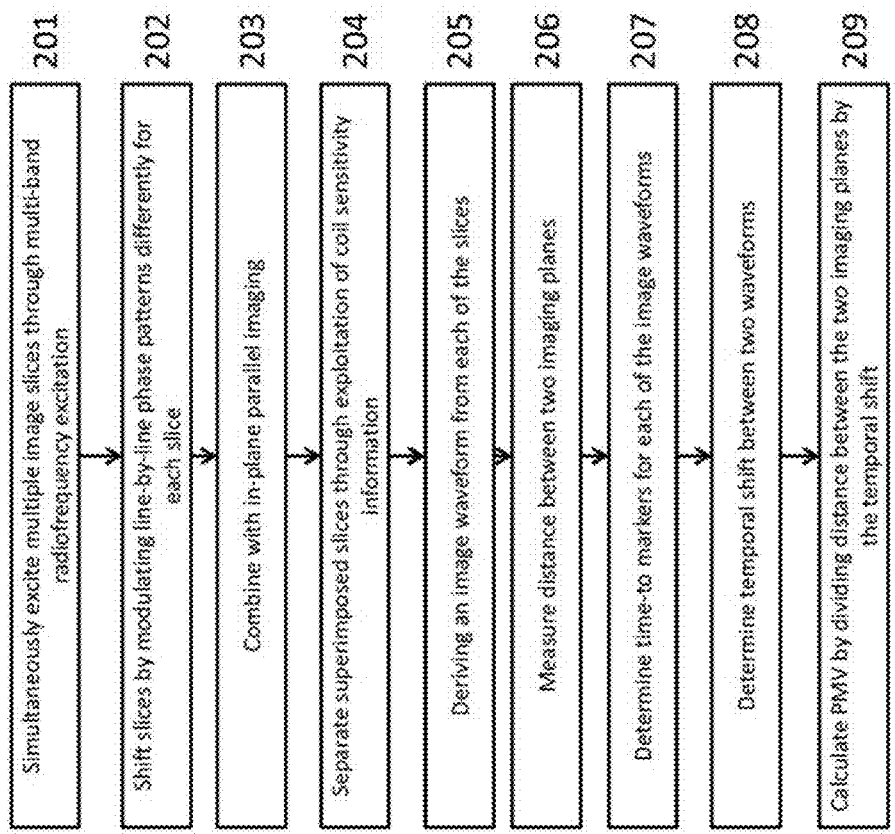
FIG. 2 illustrates a flowchart depicting a method for simultaneous multi-slice (SMS) pulse wave velocity measurement in a vessel.

FIG. 2 illustrates a flowchart depicting a method for simultaneous multi-slice (SMS) pulse wave velocity measurement in a vessel. SMS technique is initiated by first simultaneously exciting multiple parallel imaging slices of arbitrary thickness and spacing through multi-band radiofrequency (RF) excitation from a patient 201. In an embodiment, SMS is not limit to two simultaneous slice excitation, three or more slices can be simultaneously acquired depending on the coil configuration of the medical imaging device. In an embodiment, the acceleration rate can be equal to the number of simultaneously excited slices. To reduce noise amplification, the slices can be shifted in the phase encoding direction with respect to each other by modulating the line-by-line phase patterns differently for each individual slice 202. This approach is also referred to as controlled aliasing. In an embodiment, SMS technique may also be combined with other in-plane parallel imaging techniques such as GRAPPA or SENSE to achieve higher acceleration rates 203. The multiple slices initially superimposed on top of each other can be then separated by the image process during reconstruction by exploiting coil sensitivity information 204.

Figure 3:
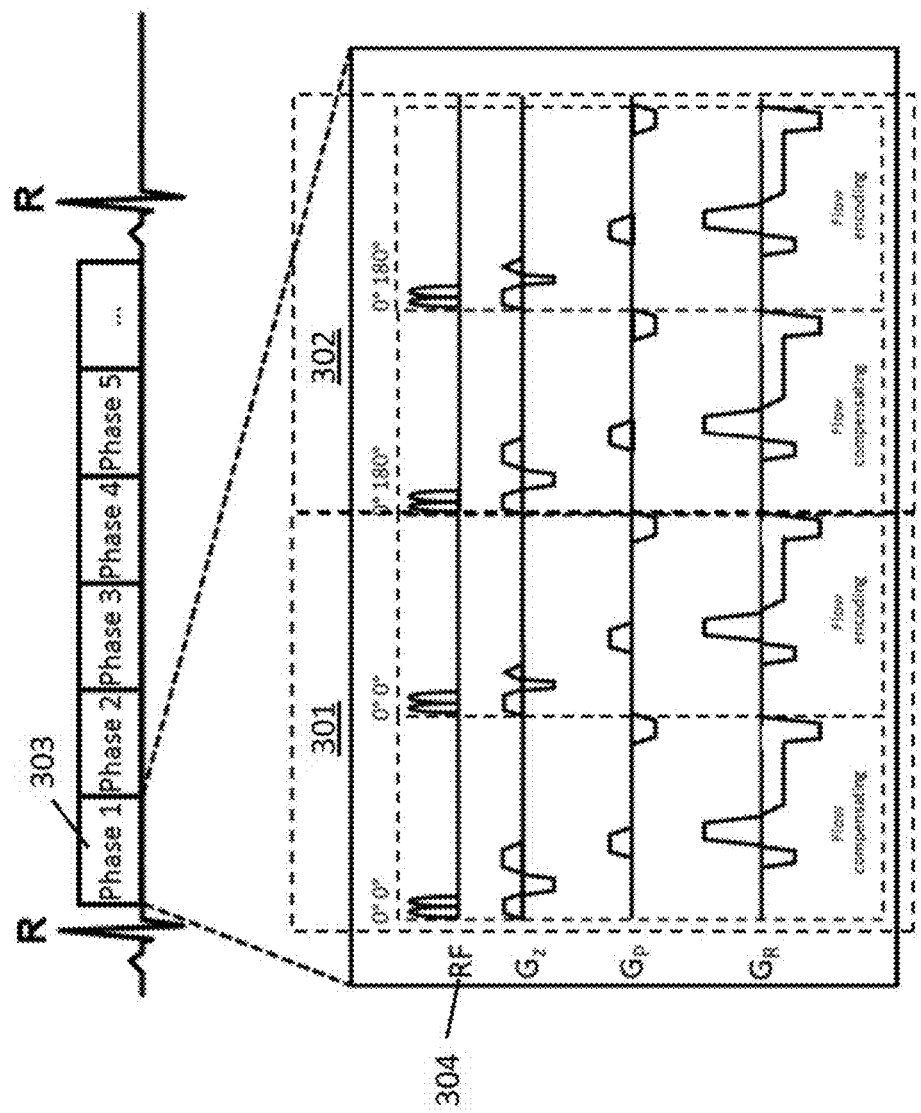
FIG. 3 depicts an example sequence diagram for a 2D cine SMS-PC sequence.

FIG. 3 depicts an example sequence diagram for a 2D cine SMS-phase contrast (PC) sequence. In this example, two slices 301, 302 can be simultaneously excited in the same acquisition phase 303. A multi-band (MB) RF pulse 304 can be used. In an embodiment, controlled aliasing in the phase-encoding direction can be implemented with phase cycling in the MB pulse. A field of view half shift (FOV/2) shift can be realized with phase cycling (0°, 0°) for the first slice 301 and (0°, 180°) for the second slice 302. Furthermore, SMS can be combined with in-plane parallel imaging to achieve better acceleration. Also, alternate embodiments contemplate using different amounts of FOV shift during controlled aliasing to generate better image quality.

Figure 4:
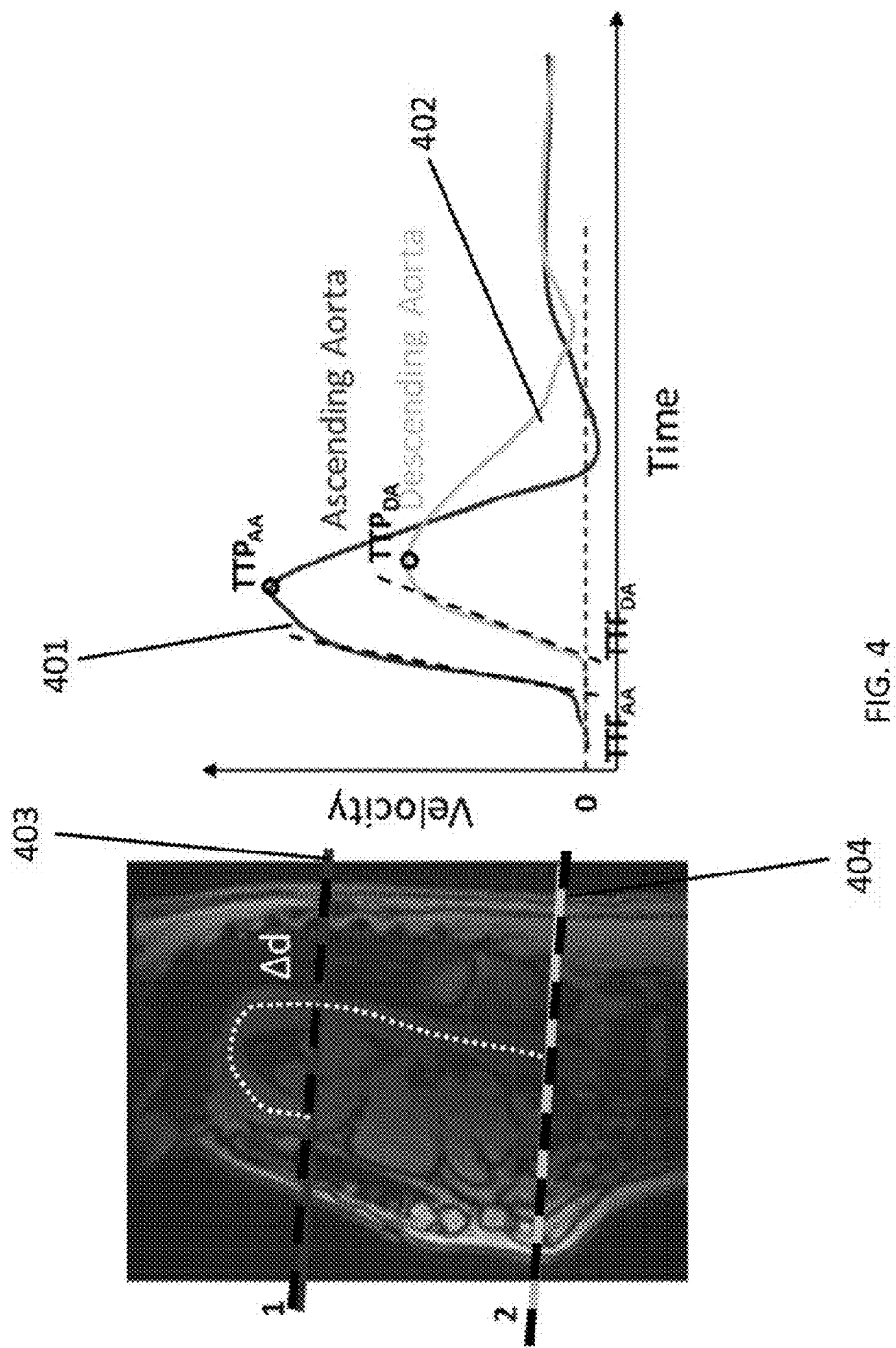
FIG. 4 illustrates a graphic depicting PWV calculation.

Returning to FIG. 2, after SMS acquisition, the system can compute PWV. The waveforms can be derived from the two imaging planes perpendicular to the ascending and descending blood vessel 205. In an embodiment, the waveforms can be derived from PC, which can measures blood flow directly, or from the signal intensity curve of the 2D cine sequence by taking the advantage of the inflow enhancement effect. Then, the distance between the two imaging planes, $\Delta d$, can be measured 206. Then, a time-to marker (in an embodiment, the time-to-peak (TTP) or time-to-foot (TTF) points) can be determined in each of the waveforms 207. The temporal shift, $\Delta t$, between two waveforms can be found by taking the time difference between the time-to markers 208. Finally, the PWV can be computed by dividing the distance between the two imaging planes, $\Delta d$, by the temporal shift, $\Delta t$, i.e. PWV=$\Delta d/\Delta t$ 209. FIG. 4 illustrates a graphic depicting PWV calculation. Velocity waveforms 401, 402 can measured in the ascending and descending aorta. The distance between the two imaging planes (the first plane 403 and the second plane 404), $\Delta d$, can be measured. The temporal shift ($\Delta t$) of the TTF or TTP can be derived from the velocity wave forms. PWV=$\Delta d/\Delta t$.

In experiment, images were acquired on two volunteers using a 1.5 T MR system. Two parallel slices across the aorta were acquired simultaneously using ECG-gated SMS-PC sequence in a single breath-hold. For comparison, the same slices were measured individually using the conventional 2D PC sequence in two separate breath-holds. From the two slices, three velocity waveforms were derived; one at the ascending aorta and two at the descending aorta. A temporal shift can be appreciated as the aorta is traversed. TTF was extracted from the flow waveforms by fitting a line to the upslope portion of the waveform and was defined as the intersection of the fitted line with the zero line. PWVs between vessel 1 and vessel 2 and between vessel 2 and vessel 3 were calculated separately as:

$$PWV_{1,2}=\Delta d_1/(TTF_2-TTF_1).$$

$$PWV_{2,3}=\Delta d_2/(TTF_3-TTF_2).$$

The global mean PWV was determined as PWV=$(PWV_{1,2}+PWV_{2,3})$. The absolute difference between $PWV_{1,2}$ and $PWV_{2,3}$ ($\Delta PWV$) was also calculated to check the consistency of the PWV measured across the aorta.

Five volunteers were enrolled in the study (three males, mean age 54.4±14.4). The PWV and $\Delta PWV$ from SMS-PC and single-slice PC are shown in Table 1:

TABLE 1

|  | $\overline{PWV}$ | $\Delta PWV$ |
| --- | --- | --- |
| Single-slice PC | 8.32 ± 4.02 | 1.75 ± 0.92 |
| SMS PC | 11.03 ± 7.91 | 7.79 ± 7.26 |

Figure 5:
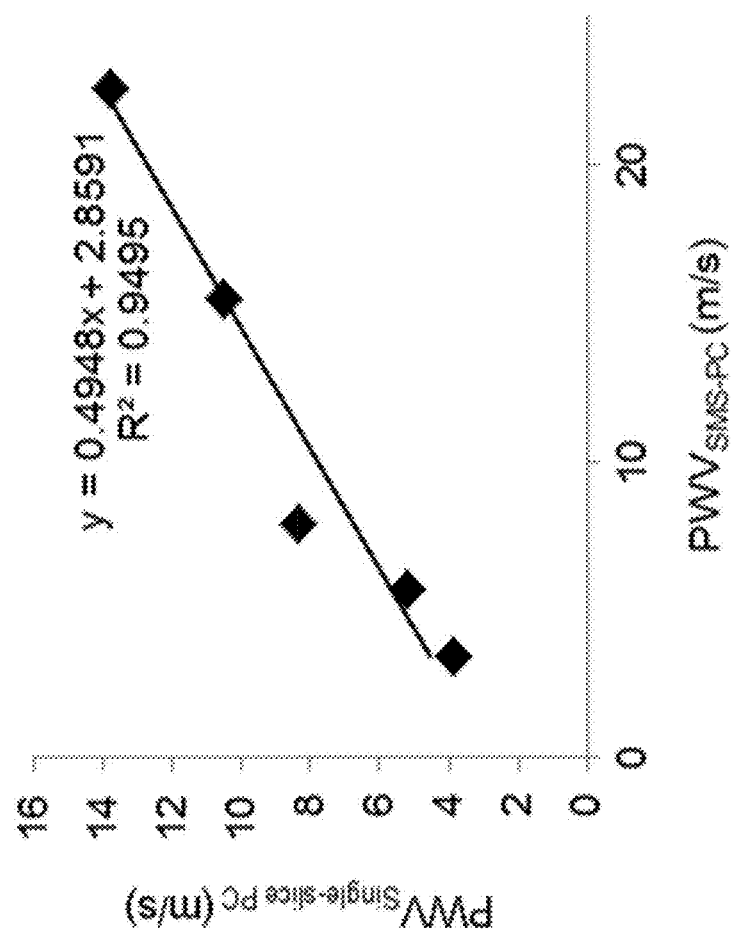
FIG. 5 depicts a graph illustrating experimental results obtained from implementing the embodiments described herein.

The measurements were not significantly different (p=0.21, as shown in FIG. 5), while $\Delta PWV$ was lower using SMS-PC, suggesting that there might be some physiological variations during the data acquisition when the two slices are acquired separately using the conventional acquisition.

Figure 6:
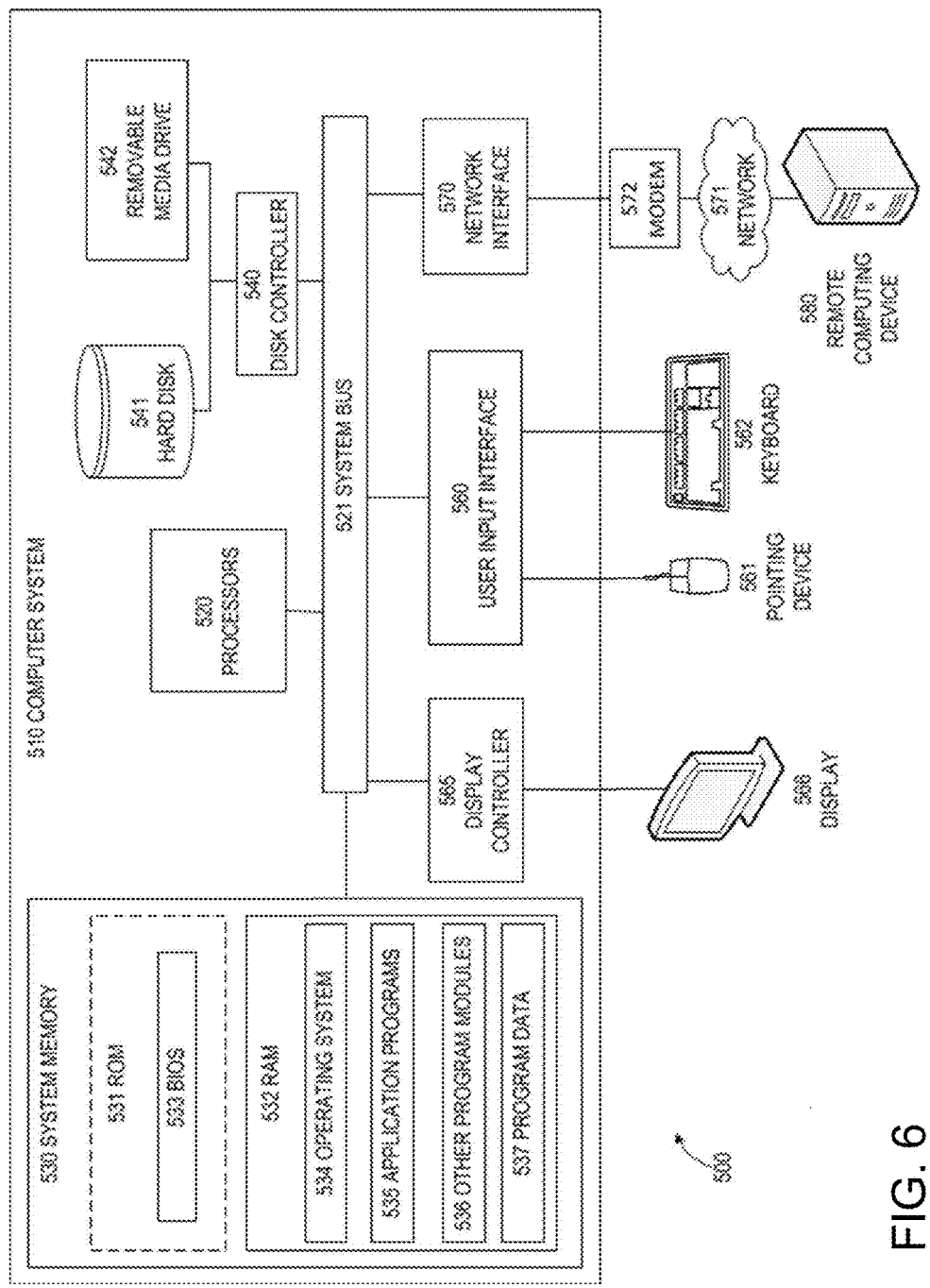
FIG. 6 illustrates an exemplary computing environment within which embodiments of the invention may be implemented.

FIG. 6 illustrates an exemplary computing environment 500 within which embodiments of the invention may be implemented. For example, the computing environment 500 may be used to implement one or more of the components illustrated in the system 100 of FIG. 1. The computing environment 500 may include computer system 510, which is one example of a computing system upon which embodiments of the invention may be implemented. Computers and computing environments, such as computer system 510 and computing environment 500, are known to those of skill in the art and thus are described briefly here.

As shown in FIG. 6, the computer system 510 may include a communication mechanism such as a bus 521 or other communication mechanism for communicating information within the computer system 510. The computer system 510 further includes one or more processors 520 coupled with the bus 521 for processing the information. The processors 520 may include one or more central processing units (CPUs), graphical processing units (GPUs), or any other processor known in the art.

The computer system 510 also includes a system memory 530 coupled to the bus 521 for storing information and instructions to be executed by processors 520. The system memory 530 may include computer readable storage media in the form of volatile and/or nonvolatile memory, such as read only memory (ROM) 531 and/or random access memory (RAM) 532. The system memory RAM 532 may include other dynamic storage device(s) (e.g., dynamic RAM, static RAM, and synchronous DRAM). The system memory ROM 531 may include other static storage device(s) (e.g., programmable ROM, erasable PROM, and electrically erasable PROM). In addition, the system memory 530 may be used for storing temporary variables or other intermediate information during the execution of instructions by the processors 520. A basic input/output system (BIOS) 533 containing the basic routines that help to transfer information between elements within computer system 510, such as during start-up, may be stored in ROM 531. RAM 532 may contain data and/or program modules that are immediately accessible to and/or presently being operated on by the processors 520. System memory 530 may additionally include, for example, operating system 534, application programs 535, other program modules 536 and program data 537.

The computer system 510 also includes a disk controller 540 coupled to the bus 521 to control one or more storage devices for storing information and instructions, such as a hard disk 541 and a removable media drive 542 (e.g., floppy disk drive, compact disc drive, tape drive, and/or solid state drive). The storage devices may be added to the computer system 510 using an appropriate device interface (e.g., a small computer system interface (SCSI), integrated device electronics (IDE), Universal Serial Bus (USB), or FireWire).

The computer system 510 may also include a display controller 565 coupled to the bus 521 to control a display 566, such as a cathode ray tube (CRT) or liquid crystal display (LCD), for displaying information to a computer user. The computer system includes an input interface 560 and one or more input devices, such as a keyboard 562 and a pointing device 561, for interacting with a computer user and providing information to the processor 520. The pointing device 561, for example, may be a mouse, a trackball, or a pointing stick for communicating direction information and command selections to the processor 520 and for controlling cursor movement on the display 566. The display 566 may provide a touch screen interface which allows input to supplement or replace the communication of direction information and command selections by the pointing device 561.

The computer system 510 may perform a portion or all of the processing steps of embodiments of the invention in response to the processors 520 executing one or more sequences of one or more instructions contained in a memory, such as the system memory 530. Such instructions may be read into the system memory 530 from another computer readable medium, such as a hard disk 541 or a removable media drive 542. The hard disk 541 may contain one or more datastores and data files used by embodiments of the present invention. Datastore contents and data files may be encrypted to improve security. The processors 520 may also be employed in a multi-processing arrangement to execute the one or more sequences of instructions contained in system memory 530. In alternative embodiments, hard-wired circuitry may be used in place of or in combination with software instructions. Thus, embodiments are not limited to any specific combination of hardware circuitry and software.

As stated above, the computer system 510 may include at least one computer readable medium or memory for holding instructions programmed according to embodiments of the invention and for containing data structures, tables, records, or other data described herein. The term "computer readable medium" as used herein refers to any medium that participates in providing instructions to the processor 520 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 541 or removable media drive 542. Non-limiting examples of volatile media include dynamic memory, such as system memory 530. Non-limiting examples of transmission media include coaxial cables, copper wire, and fiber optics, including the wires that make up the bus 521. Transmission media may also take the form of acoustic or light waves, such as those generated during radio wave and infrared data communications.

The computing environment 500 may further include the computer system 510 operating in a networked environment using logical connections to one or more remote computers, such as remote computer 580. Remote computer 580 may be a personal computer (laptop or desktop), a mobile device, a server, a router, a network PC, a peer device or other common network node, and typically includes many or all of the elements described above relative to computer system 510. When used in a networking environment, computer system 510 may include modem 572 for establishing communications over a network 571, such as the Internet. Modem 572 may be connected to bus 521 via user network interface 570, or via another appropriate mechanism.

Network 571 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 510 and other computers (e.g., remote computer 580). The network 571 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 571.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. A computer-implemented method for simultaneous multi-slice pulse wave velocity measurement, the method comprising:
    simultaneously exciting a plurality of multiple parallel images slices from a medical imaging device;
    shifting the plurality of image slices through modulation of the line-by-line phase patterns for each slice in the plurality of slices;
    deriving a plurality of image waveforms from the plurality of slices;
    measuring a distance between a plurality of imaging planes corresponding to the plurality of image slices;
    determining, for each of the image waveforms, a time-to marker;
    determining the temporal shift by calculating the difference between the time-to markers; and
    computing the pulse wave velocity by dividing the distance between the plurality of imaging planes by the temporal shift.

2. The method as recited in claim 1, further comprising:
    separating the plurality of image slices through exploitation of coil sensitivity information.

3. The method as recited in claim 1, further comprising:
    acquiring a plurality of image slices from a medical imaging device using in-plane parallel imaging techniques.

4. The method as recited in claim 1, further comprising:
    deriving the plurality of image waveforms from the plurality of slices using cine or phase contrast.

5. The method as recited in claim 1, further comprising:
    deriving the plurality of image waveforms from the plurality of slices using a signal intensity curve of a 2D cine sequence or a velocity waveform of a 2D phase contrast sequence.

6. The method as recited in claim 1, wherein the plurality of multiple parallel images slices comprises at least two image slices.

7. The method as recited in claim 1, wherein the time-to markers comprise either a time-to-peak or time-to-foot.

8. A non-transitory computer program product for simultaneous multi-slice pulse wave velocity measurement, the non-transitory computer program product comprising a non-transitory computer readable storage medium having program instructions embodied therewith, the program instructions executable by a processor to cause the processor to:
    simultaneously excite a plurality of multiple parallel images slices from a medical imaging device;
    shift the plurality of image slices through modulation of the line-by-line phase patterns for each slice in the plurality of slices;
    derive a plurality of image waveforms from the plurality of slices;
    measure a distance between a plurality of imaging planes corresponding to the plurality of image slices;
    determine, for each of the image waveforms, a time-to marker;
    determine the temporal shift by calculating the difference between the time-to markers; and
    compute the pulse wave velocity by dividing the distance between the plurality of imaging planes by the temporal shift.

9. The non-transitory computer program product as recited in claim 8, wherein the processor is further caused to:
    separate the plurality of image slices through exploitation of coil sensitivity information.

10. The non-transitory computer program product as recited in claim 8, wherein the processor is further caused to:
    acquire a plurality of image slices from a medical imaging device using in-plane parallel imaging techniques.

11. The non-transitory computer program product as recited in claim 8, wherein the processor is further caused to:
    derive the plurality of image waveforms from the plurality of slices using cine or phase contrast.

12. The non-transitory computer program product as recited in claim 8, wherein the processor is further caused to:
    derive the plurality of image waveforms from the plurality of slices using a signal intensity curve of a 2D cine sequence or velocity curve of a 2D phase contrast sequence.

13. The non-transitory computer program product as recited in claim 8, wherein the plurality of multiple parallel images slices comprises at least two image slices.

14. The non-transitory computer program product as recited in claim 8, wherein the time-to markers comprise either a time-to-peak or time-to-foot.

15. A system for simultaneous multi-slice pulse wave velocity measurement, the system comprising:
    a medical imaging device comprising:
        a magnetic field generator;
        a RF module;
        a gradient and shim coil control module; and
        an image processor configured to:
            simultaneously excite a plurality of multiple parallel images slices from the medical imaging device;
            shift the plurality of image slices through modulation of the line-by-line phase patterns for each slice in the plurality of slices;
            derive a plurality of image waveforms from the plurality of slices;
            measure a distance between a plurality of imaging planes corresponding to the plurality of image slices;
            determine, for each of the image waveforms, a time-to marker;
            determine the temporal shift by calculating the difference between the time-to markers; and
            compute the pulse wave velocity by dividing the distance between the plurality of imaging planes by the temporal shift.

16. The system as recited in claim 15, wherein the image processor is further configured to:
    separate the plurality of image slices through exploitation of coil sensitivity information.

17. The system as recited in claim 15, wherein the image processor is further configured to:
    acquire a plurality of image slices from a medical imaging device using in-plane parallel imaging techniques.

18. The system as recited in claim 15, wherein the image processor is further configured to:
    derive the plurality of image waveforms from the plurality of slices using cine or phase contrast.

19. The system as recited in claim 15, wherein the image processor is further configured to:

derive the plurality of image waveforms from the plurality of slices using a signal intensity curve of a 2D cine sequence or velocity curve of a 2D phase contrast sequence.

20. The system as recited in claim 15, wherein the plurality of multiple parallel images slices comprises at least two image slices.

* * * * *